(12) United States Patent
Kawakami et al.

(10) Patent No.: US 10,603,964 B2
(45) Date of Patent: Mar. 31, 2020

(54) PNEUMATIC TIRE

(71) Applicant: BRIDGESTONE CORPORATION, Tokyo (JP)

(72) Inventors: Shinichiro Kawakami, Tokorozawa (JP); Hiroshi Kawabe, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 329 days.

(21) Appl. No.: 14/765,585

(22) PCT Filed: Feb. 12, 2014

(86) PCT No.: PCT/JP2014/053183
§ 371 (c)(1),
(2) Date: Aug. 4, 2015

(87) PCT Pub. No.: WO2014/126098
PCT Pub. Date: Aug. 21, 2014

(65) Prior Publication Data
US 2015/0367688 A1    Dec. 24, 2015

(30) Foreign Application Priority Data

Feb. 15, 2013 (JP) ................. 2013-028158
Feb. 15, 2013 (JP) ................. 2013-028159
Feb. 15, 2013 (JP) ................. 2013-028160

(51) Int. Cl.
*B60C 15/024*    (2006.01)
*B60C 5/00*    (2006.01)
(52) U.S. Cl.
CPC .............. *B60C 15/024* (2013.01); *B60C 5/00* (2013.01)

(58) Field of Classification Search
CPC .............................. B60C 15/024; B60C 15/02
(Continued)

(56) References Cited

U.S. PATENT DOCUMENTS 5,297,606 A    3/1994  Pompier et al.
2010/0263779 A1    10/2010  Riegel et al.

FOREIGN PATENT DOCUMENTS

JP    63-149207 A    6/1988
JP    7-156616 A    6/1995
(Continued)

OTHER PUBLICATIONS

Communication dated Mar. 1, 2017 from the State Intellectual Property Office of the P.R.C. in counterpart Application No. 201480008416.6.
(Continued)

*Primary Examiner* — Justin R Fischer
*Assistant Examiner* — Philip N Schwartz
(74) *Attorney, Agent, or Firm* — Sughrue Mion, PLLC

(57) ABSTRACT

A back surface part (13) is arranged on an inner surface (35) facing an inner side of a rim flange part (32) in a tire width direction (H) or arranged closer to the inner side in the tire width direction (H) than the inner surface (35), in a no-load reference state where a pneumatic tire (10) is mounted on an applied rim (30) and the internal pressure of the pneumatic tire (10) is set to atmospheric pressure, and a flat surface part (20) extending linearly along a tire radial direction (R) in the reference state is formed in a connecting portion of the back surface part (13) connected with a heel part (14), thereby making it possible to prevent a large force from acting thereon from the applied rim (30) and to improve uniformity.

6 Claims, 2 Drawing Sheets

(58) Field of Classification Search
USPC .................................................. 152/544, 539
See application file for complete search history.

(56) References Cited

FOREIGN PATENT DOCUMENTS

| | | |
|---|---|---|
| JP | 10-203122 A | 8/1998 |
| JP | 11-91322 A | 4/1999 |
| JP | 2000062418 A | 2/2000 |
| JP | 2002254908 A | 9/2002 |
| JP | 2006-248316 A | 9/2006 |
| JP | 2011-500413 A | 1/2011 |
| JP | 2013-1157 A | 1/2013 |

OTHER PUBLICATIONS

International Search Report for PCT/JP2014/053183 dated May 13, 2014.

PNEUMATIC TIRE

TECHNICAL FIELD

The present invention relates to a pneumatic tire.

Priority is claimed on Japanese Patent Application Nos. 2013-028158, 2013-028159, and 2013-28160, filed Feb. 15, 2013, the contents of which are incorporated herein by reference.

BACKGROUND ART

In the related art, for example, a pneumatic tire, which is mounted on an applied rim having a rim base part and a rim flange part as shown in the following Patent Document 1, has been known. In this pneumatic tire, each of a pair of left and right bead parts is provided with a base surface part that faces an inner side in a tire radial direction and is supported from the inner side in the tire radial direction by a rim base part; a back surface part that faces an outer side in a tire width direction and is supported from the outer side in the tire width direction by a rim flange part; and a heel part that couples an end portion of the base surface part on the outer side in the tire width direction and an end portion of the back surface part on the inner side in the tire radial direction.

CITATION LIST

Patent Document

[Patent Document 1] Published Japanese Translation No. 2011-500413 of the PCT International Publication

SUMMARY OF INVENTION

Technical Problem

In the related-art pneumatic tire, when the bead part is deformed such that the pneumatic tire receives a load, there is a possibility that the back surface part may be strongly brought into pressure contact with the rim flange part, and a large force may act on the pneumatic tire from the applied rim. In this case, there is a possibility that the comfort of riding may be affected. Additionally, in the related-art pneumatic tire, there is room for improvement of uniformity.

The invention has been made in view of the aforementioned circumstances, and an object thereof is to provide a pneumatic tire that can prevent a large force from acting thereon from an applied rim and can improve uniformity.

Solution to Problem

In order to solve the above problems, the invention suggests the following means.

A pneumatic tire according to the invention, is a pneumatic tire mounted on an applied rim, in which each of a pair of left and right bead parts each having a bead core buried therein is provided with: a base surface part that faces an inner side in a tire radial direction and is supported from the inner side in the tire radial direction by a rim base part of the applied rim; a back surface part that faces an outer side in a tire width direction and is supported from the outer side in the tire width direction by a rim flange part of the applied rim; and a heel part that couples an end portion of the base surface part on the outer side in the tire width direction and an end portion of the back surface part on the inner side in the tire radial direction, in which the back surface part is arranged on an inner surface facing an inner side of the rim flange part in a tire width direction or arranged closer to the inner side in the tire width direction than the inner surface, in a no-load reference state where the pneumatic tire is mounted on the applied rim and the internal pressure of the pneumatic tire is set to atmospheric pressure, and in which in a flat surface part extending linearly along the tire radial direction in the reference state is formed in a connecting portion of the back surface part connected with the heel part.

According to this invention, since the back surface part is arranged on the inner surface of the rim flange part or closer to the inner side in the tire width direction than the inner surface in the reference state, the back surface part can be prevented from locally abutting against the rim flange part when the bead part is deformed such that the pneumatic tire receives a load. Accordingly, the back surface part can be prevented from being strongly brought into pressure contact with the rim flange part, it is possible to prevent a large force from acting on the pneumatic tire from the applied rim, and for example, the comfort of riding can be improved.

Moreover, since the flat surface part is formed in the connecting portion of the back surface part connected with the heel part, for example, compared to a configuration in which the connecting portion gradually extends toward the inner side in the tire width direction as it is directed from the inner side to the outer side in the tire radial direction, the connecting portion can be prevented from excessively separating in the tire width direction from the inner surface of the rim flange part. Accordingly, when the bead part is deformed, it is possible to prevent the back surface part from colliding against the rim flange part to generate an impact force, and a large force can be effectively prevented from acting on the pneumatic tire from the applied rim.

Additionally, since the back surface part is arranged on the inner surface of the rim flange part or closer to the inner side in the tire width direction than the inner surface in the reference state, the back surface part can be prevented from locally abutting against the rim flange part even when the internal pressure of the pneumatic tire is made to have a positive pressure by, for example, being made to have regular internal pressure. Accordingly, it is possible to position the bead part with high precision with respect to the applied rim. Moreover, it is possible to easily make the positions of the bead part in the tire width direction and the tire radial direction with respect to the applied rim equal over the whole circumference of the bead part. Therefore, uniformity can be improved irrespective of tire size.

Meanwhile, when the pneumatic tire is mounted on the applied rim, for example, the applied rim is arranged on the inner side of the pneumatic tire in the tire radial direction, in a state where a pair of the left and right bead parts are elastically deformed toward the inner side in the tire width direction and the distance in the tire width direction between the pair of left and right bead parts is shortened, and thereafter, the bead parts are restored and moved to the outer side in the tire width direction while the bead parts are made to slide on the rim base part.

Here, the back surface part is arranged on the inner surface of the rim flange part or closer to the inner side in the tire width direction than the inner surface in the reference state. Therefore, for example, compared to a configuration in which the back surface part is brought into pressure contact with the inner surface of the rim flange part in the reference state, it is possible to have a situation in which the back surface part runs against the rim flange part and the movement of the bead part is hindered when the bead part is restored and moved as mentioned above in the process of mounting the pneumatic tire on the applied rim. Accordingly, when the pneumatic tire is mounted on the applied rim, it is possible to smoothly move the bead part in the tire width direction to position the bead part with high precision with respect to the applied rim. Moreover, it is possible to easily make the positions of the bead part in the tire width direction and the tire radial direction equal over the whole circumference of the bead part, and uniformity can be improved.

In addition, the base surface part is formed with: a first inclined surface that inclines with respect to an imaginary reference line extending along the tire width direction and extends linearly toward the inner side in the tire radial direction as it is directed from the outer side to the inner side in the tire width direction, in a sectional view along both the tire width direction and the tire radial direction; and a second inclined surface that is connected to the first inclined surface from the inner side in the tire width direction and that inclines with respect to the imaginary reference line in the sectional view, an inclination angle of the second inclined surface formed with respect to the imaginary reference line being larger than an inclination angle at which the first inclined surface is formed with the imaginary reference line. The first inclined surface may be disposed at the portion of the base surface part corresponding to the bead core over the entire length of this portion in the tire width direction.

In this case, the first inclined surface is disposed at the portion of the base surface part corresponding to the bead core over the entire length of this portion in the tire width direction. Therefore, the thickness of the bottom portion of the bead part located closer to the inner side in the tire radial direction than the bead core can be gradually increased according to the inclination angle of the first inclined surface as it is directed from the outer side to the inner side in the tire width direction. Accordingly, in a state where the pneumatic tire is mounted on the applied rim, it is possible to easily make the compressibility, in the tire radial direction, of the bottom portion of the bead part equal irrespective of the position of the bottom portion in the tire width direction, and the base surface part can be prevented from being strongly and locally brought into pressure contact with the rim base part. Therefore, when the pneumatic tire is mounted on the applied rim, it is possible to smoothly mount the pneumatic tire on the applied rim and to position the bead part with high precision with respect to the applied rim. Moreover, it is possible to easily make the positions of the bead part in the tire width direction and the tire radial direction with respect to the applied rim equal over the whole circumference of the bead part, and uniformity can be improved irrespective of tire size.

Additionally, since the base surface part is formed with the second inclined surface of which the inclination angle is larger than the inclination angle of the first inclined surface, the second inclined surface can be brought into pressure contact with the rim base part to be stronger than the first inclined surface. Accordingly, the sealing performance between the bead part and the rim base part can be ensured, and the bead part can be prevented from positionally deviating with respect to the applied rim.

Additionally, each of the pair of left and right bead parts is provided with the back surface part that faces the outer side in the tire width direction and is supported from the outer side in the tire width direction by the rim flange part; and the heel part that couples the end portion of the base surface part on the outer side in the tire width direction and the end portion of the back surface part on the inner side in the tire radial direction. The bead part is formed in a linear line or a concavely curved line that gradually extends toward the outer side in the tire radial direction as it is directed from the inner side to the outer side in the tire width direction, in the sectional view. A coupling part between the heel part and the base surface part, and a coupling part between the heel part and the back surface part may each be formed in a convexly curved line in the sectional view, and the bead core may be arranged on the inner side in the tire width direction with respect to the heel part.

In this case, when the pneumatic tire is mounted on the applied rim, for example, the applied rim is arranged on the inner side of the pneumatic tire in the tire radial direction in a state where a pair of the left and right bead parts are elastically deformed toward the inner side in the tire width direction and the distance in the tire width direction between the pair of left and right bead parts is shortened. Therefore, the bead parts are restored and moved to the outer side in the tire width direction while the bead parts are made to slide on the rim base part, and the bead parts are made to ride over the hump part, which is provided to protrude from the rim base part toward the outer side in the tire radial direction, in the tire width direction.

Here, the bead part is formed in a linear line or a concavely curved line that gradually extends toward the outer side in the tire radial direction as it is directed from the inner side to the outer side in the tire width direction, in the sectional view. Therefore, when the bead part is made to ride over the hump part as mentioned above, it is possible to prevent the movement of the bead part from being hindered due to the heel part being caught in the hump part, and the bead part can be made to smoothly ride over the hump part. Accordingly, when the pneumatic tire is mounted on the applied rim, it is possible to smoothly move the bead part in the tire width direction to position the bead part with high precision with respect to the applied rim. Moreover, it is possible to easily make the positions of the bead part in the tire width direction and the tire radial direction equal over the whole circumference of the bead part, and uniformity can be improved. Additionally, since the coupling part between the heel part and the base surface part, and the coupling part between the heel part and the back surface part, are each formed in a convexly curved line in the sectional view, the heel part can be coupled to both the base surface part and the back surface part and form a smooth surface therebetween. Accordingly, it is possible to make the bead part more smoothly ride over the hump part, and the bead part can be positioned with higher precision with respect to the applied rim.

Moreover, since the bead core is arranged on the inner side in the tire width direction with respect to the heel part, the heel part is not sandwiched but the base surface part can be sandwiched between the bead core and the rim base part in a state where this pneumatic tire is mounted on the applied rim. Accordingly, for example, it is possible to strongly bring the bead part into pressure contact with the rim base part, for example, compared to a case where the heel part is sandwiched between the bead core and the rim base part. Accordingly, the sealing performance between the bead part and the rim base part can be ensured, and the bead part can be prevented from positionally deviating with respect to the applied rim.

In addition, the tire radial distance of the bead core 17 from the heel part 14 to the base surface part 12 and the tire width-direction distance of the bead core 17 from the heel part 14 to the back surface part 13 are made such that one thereof is 90% to 100% of the other. Thus, forces acting from the applied rim to the base surface part 12 and the back surface part 13 can be balanced.

Advantageous Effects of Invention

According to the pneumatic tire related to the invention, a large force can be prevented from acting thereon from the applied rim, and uniformity can be improved.

DESCRIPTION OF EMBODIMENTS

A pneumatic tire related to an embodiment of the invention will be described below with reference to the drawings.

Figure 1:
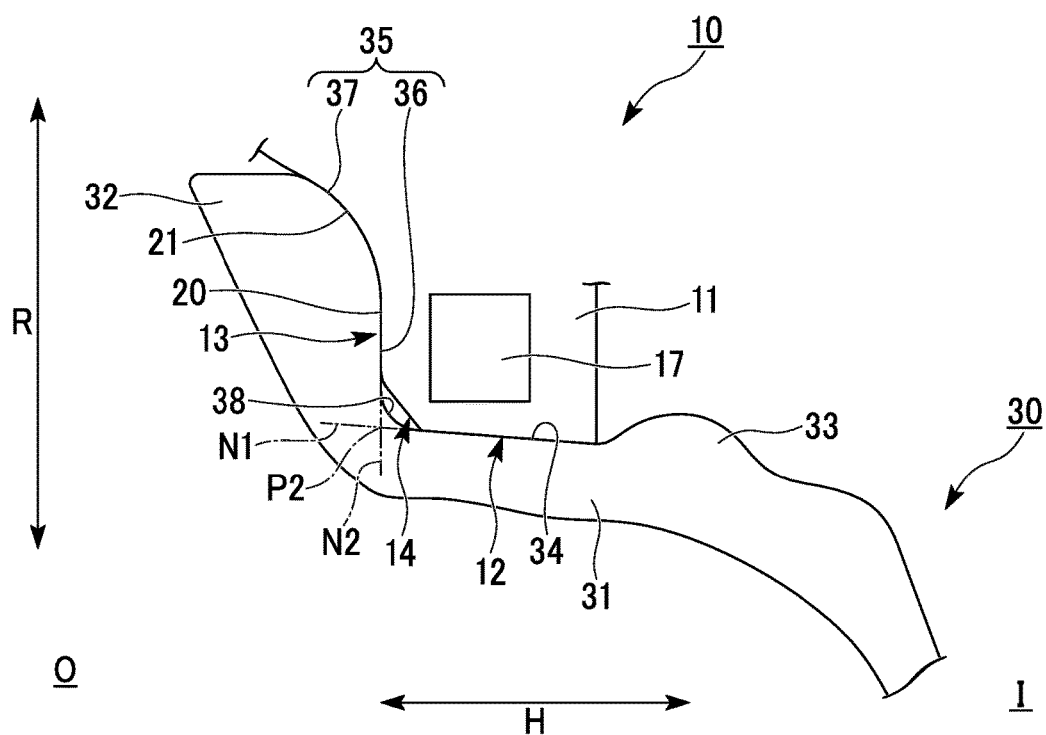
FIG. 1 is a sectional view of a reference state of a pneumatic tire related to an embodiment of the invention.

As shown in FIG. 1, a pneumatic tire 10 is mounted on an applied rim 30. In addition, the applied rim 30 refers to a rim that is defined according to tire size in JATMA (Japan Automobile Tire Manufacturers Association) YEAR BOOK, ETRTO (European Tire and Rim Technical Organization) STANDARD MANUAL, TRA (THE TIRE and RIM ASSOCIATION INC.) YEAR BOOK, or the like.

The applied rim 30 includes a rim base part 31, a rim flange part 32, and a hump part 33. The rim base part 31 extends in a tire width direction H in a sectional view along the tire width direction H and a tire radial direction R. The rim flange part 32 and the hump part 33 are provided so as to protrude toward an outer side in the tire radial direction R from the rim base part 31. The rim flange part 32 is disposed at an end portion of the rim base part 31 on an outer side O in the tire width direction H, and the hump part 33 is disposed closer to an inner side I in the tire width direction H than the rim flange part 32. The protruding amount of the rim flange part 32 from the rim base part 31 is larger than the protruding amount of the hump part 33 from the rim base part 31.

An inner surface 35 facing the inner side I in the tire width direction H in the rim flange part 32 is formed such that a linear part 36 located on the inner side in the tire radial direction R and formed linearly in a sectional view, and a curved part 37 located on the outer side in the tire radial direction R and formed in a convexly curved line in the sectional view are continuously provided. The linear part 36 extends along the tire radial direction R in the sectional view. The curved part 37 gradually extends toward the outer side O in the tire width direction H as it is directed from the inner side to the outer side in the tire radial direction R in the sectional view. The linear part 36 and the curved part 37 are coupled together and form a smooth surface therebetween.

The hump part 33 is formed so as to become convex toward the outer side in the tire radial direction R in the sectional view, and the surface of the hump part 33 is formed in a convexly curved line in the sectional view.

A support surface 34 located between the rim flange part 32 and the hump part 33 in the surface of the rim base part 31 that faces the outer side in the tire radial direction R gradually extends linearly toward the inner side in the tire radial direction R as it is directed from the outer side O to the inner side I in the tire width direction H, in the sectional view. The support surface 34 is coupled to an inner surface 35 of the rim flange part 32 via a coupling surface 38.

The coupling surface 38 is formed in a concavely curved line in the sectional view. The coupling surface 38 gradually extends toward the outer side in the tire radial direction R as it is directed from the inner side I to the outer side O in the tire width direction H.

The coupling surface 38 is coupled to both the inner surface 35 of the rim flange part 32 and the support surface 34 and form a smooth surface therebetween.

The pneumatic tire 10 assumes a hollow toroidal shape that forms a tire cavity in cooperation with the applied rim 30. The pneumatic tire 10 includes a pair of left and right bead parts 11.

Each of the pair of left and right bead parts 11 includes a base surface part 12, a back surface part 13, and a heel part 14. The base surface part 12 faces the inner side in the tire radial direction R. The base surface part 12 is supported by the rim base part 31 from the inner side in the tire radial direction R. The base surface part 13 faces the inner side in the tire radial direction R. The back surface part 13 is supported by the rim flange part 32 from the outer side O in the tire width direction H.

Figure 2:
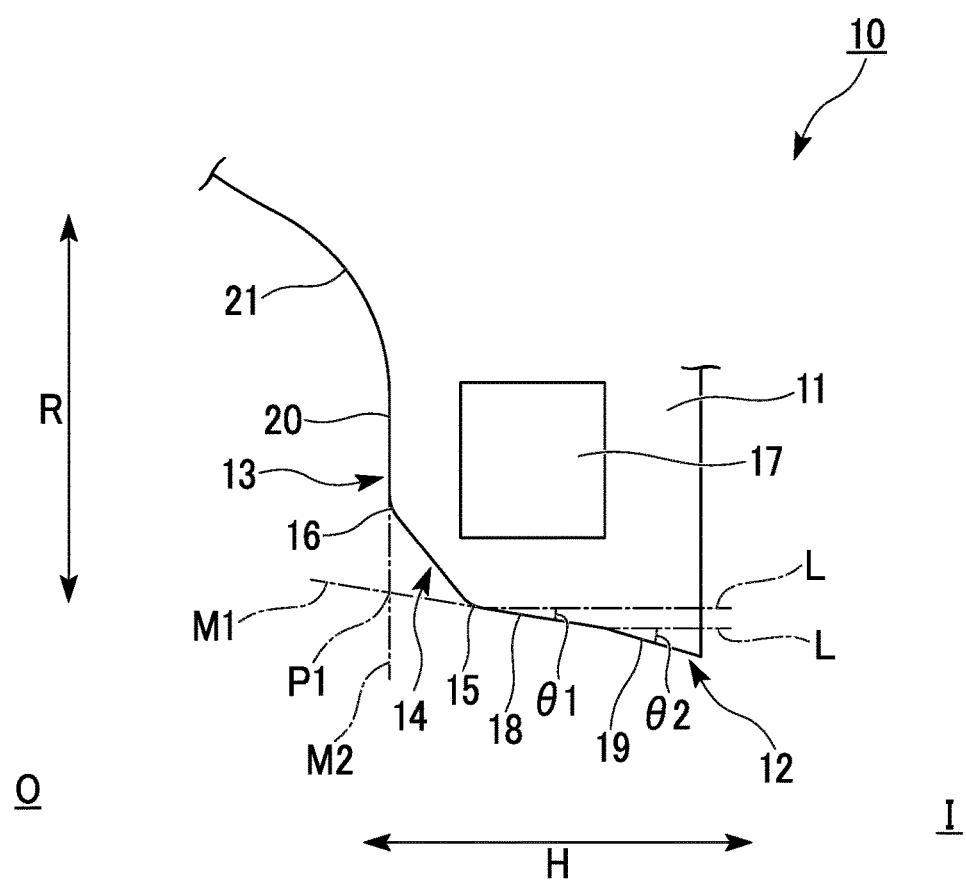
FIG. 2 is a sectional view of a free state of the pneumatic tire shown in FIG. 1.

As shown in FIG. 2, the heel part 14 couples an end portion of the base surface part 12 on the outer side O in the tire width direction H and an end portion of the back surface part 13 on the inner side in the tire radial direction R. The heel part 14 is formed in a linear line or a concavely curved line such that it gradually extends toward the outer side in the tire radial direction R as it is directed from the inner side I to the outer side O in the tire width direction H, in the sectional view, in a free state before the pneumatic tire 10 is mounted on the applied rim 30. The heel part 14 is formed linearly in the sectional view.

A coupling part 15 between the heel part 14 and the base surface part 12, and a coupling part 16 between the heel part 14 and the back surface part 13, are both formed in a convexly curved line in the sectional view. The curvatures of both of the coupling parts 15 and 16 are made equal to each other. The coupling part 15 between the heel part 14 and the base surface part 12 is connected to both the heel part 14 and the base surface part 12 and form a smooth surface therebetween. The coupling part 16 between the heel part 14 and the back surface part 13 is connected to both the heel part 14 and the back surface part 13 and form a smooth surface therebetween.

Bead cores 17 are buried in both of left and right bead parts 11. Each bead core 17 is arranged on the inner side I in the tire width direction H with respect to the heel part 14. An end portion of the bead core 17 on the outer side O in the tire width direction H and the end portion of the base surface part 12 on the outer side O in the tire width direction H are arranged at the same position in the tire width direction H. An end portion of the bead core 17 on the inner side in the tire radial direction R is located closer to the inner side in the tire radial direction R than an end portion of the heel part 14 on the outer side in the tire radial direction R. The thickness of the thickest portion of the portion of the bead part 11 located between the heel part 14 and the bead core 17 is, for example, 1.0 mm to 5.0 mm.

The base surface part 12 is formed with a first inclined surface 18 and a second inclined surface 19. The first inclined surface 18 inclines with respect to an imaginary reference line L extending along the tire width direction H, and extends linearly toward the inner side in the tire radial direction R as it is directed from the outer side O to the inner side I in the tire width direction H, in the sectional view. In addition, an inclination angle θ1 at which the first inclined surface 18 is formed with respect to the imaginary reference line L may be, for example, 6.5 degrees or more and 12 degrees or less, or the like, in the sectional view. Moreover, the inclination angle θ1 may be about 8 degrees.

The first inclined surface 18 is disposed at the portion of the base surface part 12 corresponding to the bead core 17 over the entire length of this portion in the tire width direction H. The end portion of the base surface part 12 on the outer side O in the tire width direction H is also included in the portion of the base surface part 12 corresponding to the bead core 17, and the first inclined surface 18 is connected to the heel part 14 from the inner side I in the tire width direction H. An end portion of the first inclined surface 18 on the outer side O in the tire width direction H and an end portion of the bead core 17 on the outer side O in the tire width direction H are arranged at the same position in the tire width direction H.

The second inclined surface 19 is connected to the first inclined surface 18 from the inner side I in the tire width direction H. The second inclined surface 19 is disposed in the portion of the base surface part 12 located closer to the inner side I in the tire width direction H than the first inclined surface 18 over the entire length of this portion in the tire width direction H. The second inclined surface 19 inclines with respect to the imaginary reference line L in the sectional view. An inclination angle θ2 at which the second inclined surface 19 is formed with respect to the imaginary reference line L is larger than the inclination angle θ1 of the first inclined surface 18, in the sectional view. In addition, the inclination angle θ2 of the second inclined surface 19 may be 17 degrees to 23 degrees, or the like. Moreover, the inclination angle θ2 may be about 20 degrees.

Additionally, as shown in FIG. 1, the back surface part 13 is arranged on the inner surface 35 of the rim flange part 32 or closer to the inner side I in the tire width direction H than the inner surface 35, in a no-load reference state where the pneumatic tire 10 is mounted on the applied rim 30 and the internal pressure of this pneumatic tire 10 is set to atmospheric pressure. In the shown example, the back surface part 13 is arranged on the inner surface 35 so as to run along the inner surface 35 of the rim flange part 32 in the reference state. Additionally, the back surface part 13 is arranged on the inner surface 35 of the rim flange part 32 over the entire length of the inner surface 35 in the tire radial direction R, and is brought into non-pressure contact with the inner surface 35.

A flat surface part 20 extending linearly along the tire radial direction R in the reference state is formed in a connecting portion of the back surface part 13 connected with the heel part 14 including the end portion on the inner side in the tire radial direction R. The flat surface part 20 is arranged on the linear part 36. An end portion of the flat surface part 20 on the outer side in the tire radial direction R and an end portion of the bead core 17 on the outer side in the tire radial direction R are arranged at the same position in the tire radial direction R.

A concave surface part 21 extending in a concavely curved line that faces the outer side O in the tire width direction H gradually as it is directed from the inner side to the outer side in the tire radial direction R in the sectional view is formed in the portion of the back surface part 13 connected with the flat surface part 20 from the outer side in the tire radial direction R. The concave surface part 21 is arranged on the curved part 37.

In addition, in the present embodiment, the spacing between the pair of left and right bead parts 11 is defined as preset reference spacing in the free state shown in FIG. 2. The spacing in the tire width direction H between a pair of left and right tire reference points P1 of the pneumatic tire 10 shown in FIG. 2 is equal to the spacing in the tire width direction H between a pair of left and right rim reference points P2 of the applied rim 30 shown in FIG. 1. Here, each tire reference point P1 refers to an intersection point between a first imaginary line M1 circumscribed about the end portion of the base surface part 12 on the outer side O in the tire width direction H, and a second imaginary line M2 circumscribed about the end portion of the back surface part 13 on the inner side in the tire radial direction R, in the sectional view. In the shown example, the first imaginary line M1 is located on the first inclined surface 18, and the second imaginary line M2 is located on the flat surface part 20. Additionally, the rim reference point P2 refers to an intersection point between a first imaginary extension line N1 obtained by extending the support surface 34 of the rim base part 31 to the outer side O in the tire width direction H, and a second imaginary extension line N2 obtained by extending the linear part 36 of the inner surface 35 of the rim flange part 32 to the inner side in the tire radial direction R, in the sectional view.

Additionally, the spacing between the pair of left and right bead parts 11 also becomes the aforementioned reference spacing in the reference state as shown in FIG. 1.

When the pneumatic tire 10 is mounted on the applied rim 30, for example, the applied rim 30 is arranged on the inner side of the pneumatic tire 10 in the tire radial direction R, in a state where the pair of left and bead parts 11 are elastically deformed toward the inner side I in the tire width direction H and the distance in the tire width direction H between the pair of left and right bead parts 11 is shortened. Therefore, the bead parts 11 are restored and moved to the outer side O in the tire width direction H while the bead parts are made to slide on the rim base part 31, and the bead parts 11 are made to ride over the hump part 33 in the tire width direction H. Accordingly, the bead parts 11 are arranged at the portion of the rim base part 31 located between the rim flange part 32 and the hump part 33, and are supported by the support surface 34 from the inner side in the tire radial direction R.

As described above, according to the pneumatic tire 10 related to the present embodiment, the first inclined surface 18 is disposed at the portion of the base surface part 12 corresponding to the bead core 17 over the entire length of this portion in the tire width direction H. Therefore, as shown in FIG. 2, the thickness of the bottom portion of the bead part 11 located closer to the inner side in the tire radial direction R than the bead core 17 can be gradually increased according to the inclination angle θ1 of the first inclined surface 18 as it is directed from the outer side O to the inner side I in the tire width direction H. Accordingly, it is possible to easily make the compressibility, in the tire radial direction R, of the bottom portion of the bead part 11 in the reference state equal irrespective of the position of the bottom portion in the tire width direction H. Moreover, the base surface part 12 can be prevented from being strongly and locally brought into pressure contact with the rim base part 31. Therefore, when the pneumatic tire 10 is mounted on the applied rim 30, it is possible to smoothly mount the pneumatic tire 10 on the applied rim 30 and to position the bead part 11 with high precision with respect to the applied rim 30. Moreover, it is possible to easily make the positions of the bead part 11 in the tire width direction H and the tire radial direction R with respect to the applied rim 30 equal over the whole circumference of the bead part 11, and uniformity can be improved irrespective of tire size.

Additionally, since the base surface part 12 is formed with the second inclined surface 19 of which the inclination angle θ2 is larger than the inclination angle θ1 of the first inclined surface 18, the second inclined surface 19 can be brought into pressure contact with the rim base part 31 to be stronger than the first inclined surface 18. Accordingly, the sealing performance between the bead part 11 and the rim base part 31 can be ensured, and the bead part 11 can be prevented from positionally deviating with respect to the applied rim 30.

Additionally, according to the pneumatic tire 10 related to the present embodiment, the back surface part 13 is arranged on the inner surface 35 of the rim flange part 32 or closer to the inner side I in the tire width direction H than the inner surface 35 in the reference state. Therefore, for example, when the bead part 11 is deformed such that the pneumatic tire 10 receives a load, the back surface part 13 can be prevented from locally abutting against the rim flange part 32. Accordingly, the back surface part 13 can be prevented from being strongly brought into pressure contact with the rim flange part 32, it is possible to prevent a large force from acting on the pneumatic tire 10 from the applied rim 30, and for example, the comfort of riding can be improved.

Moreover, the connecting portion of the back surface part 13 connected with the heel part 14 is formed with the flat surface part 20. Therefore, for example, compared to a configuration in which the connecting portion gradually extends toward the inner side I in the tire width direction H as it is directed from the inner side to the outer side in the tire radial direction R, the connecting portion can be prevented from excessively separating in the tire width direction H from the inner surface 35 of the rim flange part 32. Accordingly, when the bead part 11 is deformed, it is possible to prevent the back surface part 13 from colliding against the rim flange part 32 to generate an impact force, and a large force can be effectively prevented from acting on the pneumatic tire 10 from the applied rim 30.

Additionally, since the back surface part 13 is arranged on the inner surface 35 of the rim flange part 32 or closer to the inner side I in the tire width direction H than the inner surface 35 in the reference state, the back surface part 13 can be prevented from locally abutting against the rim flange part 32 even when the internal pressure of the pneumatic tire 10 is made to be positive pressure, for example, by being made to be regular internal pressure. Accordingly, it is possible to position the bead part 11 with high precision with respect to the applied rim 30. Moreover, it is possible to easily make the positions of the bead part 11 in the tire width direction H and the tire radial direction R with respect to the applied rim 30 equal over the whole circumference of the bead part 11, and uniformity can be improved irrespective of tire size.

Moreover, the back surface part 13 is arranged on the inner surface 35 of the rim flange part 32 or closer to the inner side I in the tire width direction H than the inner surface 35 in the reference state. Therefore, for example, compared to a configuration in which the back surface part 13 is brought into pressure contact with the inner surface 35 of the rim flange part 32 in the reference state, it is possible to limit a situation in which the back surface part 13 runs against the rim flange part 32 and the movement of the bead part 11 is hindered when the bead part 11 is restored and moved as mentioned above in the process of mounting the pneumatic tire 10 on the applied rim 30. Accordingly, when the pneumatic tire 10 is mounted on the applied rim 30, it is possible to smoothly move the bead part 11 in the tire width direction H to position the bead part 11 with high precision with respect to the applied rim 30. Moreover, it is possible to easily make the positions of the bead part 11 in the tire width direction H and the tire radial direction R equal over the whole circumference of the bead part 11, and uniformity can be improved.

Additionally, the first inclined surface 18 is disposed at the portion of the base surface part 12 corresponding to the bead core 17 over the entire length of this portion in the tire width direction H. Therefore, as shown in FIG. 2, the thickness of the bottom portion of the bead part 11 located closer to the inner side in the tire radial direction R than the bead core 17 can be gradually increased according to the inclination angle θ1 of the first inclined surface 18 as it is directed from the outer side O to the inner side I in the tire width direction H. Accordingly, it is possible to easily make the compressibility, in the tire radial direction R, of the bottom portion of the bead part 11 in the reference state equal irrespective of the position of the bottom portion in the tire width direction H. Moreover, the base surface part 12 can be prevented from being strongly and locally brought into pressure contact with the rim base part 31. Therefore, when the pneumatic tire 10 is mounted on the applied rim 30, it is possible to smoothly mount the pneumatic tire 10 on the applied rim 30 and to position the bead part 11 with high precision with respect to the applied rim 30. Moreover, it is possible to easily make the positions of the bead part 11 in the tire width direction H and the tire radial direction R with respect to the applied rim 30 equal over the whole circumference of the bead part 11, and uniformity can be improved irrespective of tire size.

Additionally, since the base surface part 12 is formed with the second inclined surface 19 of which the inclination angle θ2 is larger than the inclination angle θ1 of the first inclined surface 18, the second inclined surface 19 can be brought into pressure contact with the rim base part 31 to be stronger than the first inclined surface 18. Accordingly, the sealing performance between the bead part 11 and the rim base part 31 can be ensured, and the bead part 11 can be prevented from positionally deviating with respect to the applied rim 30.

Additionally, the bead part 14 is formed in a linear line or a concavely curved line that gradually extends toward the outer side in the tire radial direction R as it is directed from the inner side I to the outer side O in the tire width direction H, in the sectional view. Therefore, when the bead part 11 is made to ride over the hump part 33 as mentioned above, it is possible to prevent the movement of the bead part 11 from being hindered due to the heel part 14 being caught in the hump part 33, and the bead part 11 can be made to smoothly ride over the hump part 33. Accordingly, when the pneumatic tire 10 is mounted on the applied rim 30, it is possible to smoothly move the bead part 11 in the tire width direction H to position the bead part 11 with high precision with respect to the applied rim 30. Moreover, it is possible to easily make the positions of the bead part 11 in the tire width direction H and the tire radial direction R equal over the whole circumference of the bead part 11, and uniformity can be improved.

Additionally, since the coupling part 15 between the heel part 14 and the base surface part 12, and the coupling part 16 between the heel part 14 and the back surface part 13, are both formed in a convexly curved line in the sectional view, the heel part 14 can be coupled to both the base surface part 12 and the back surface part 13 and form a smooth surface therebetween. Accordingly, it is possible to make the bead part 11 more smoothly ride over the hump part 33, and the bead part 11 can be positioned with higher precision with respect to the applied rim 30.

Moreover, since the bead core 17 is arranged on the inner side I in the tire width direction H with respect to the heel part 14, the heel part 14 is not sandwiched but the base surface part 12 can be sandwiched between the bead core 17 and the rim base part 31 in the reference state. Accordingly, for example, it is possible to strongly bring the bead part 11 into pressure contact with the rim base part 31, for example, compared to a case where the heel part 14 is sandwiched between the bead core 17 and the rim base part 31. Therefore, the sealing performance between the bead part 11 and the rim base part 31 can be ensured, and the bead part 11 can be prevented from positionally deviating with respect to the applied rim 30.

Additionally, the tire radial distance of the bead core 17 from the heel part 14 to the base surface part 12 and the tire width-direction distance of the bead core 17 from the heel part 14 to the back surface part 13 are made such that one thereof is 90% to 100% of the other, so that forces acting from the applied rim 30 to the base surface part 12 and the back surface part 13 can be balanced.

In addition, the technical scope of the invention is not limited to the aforementioned embodiment, and various changes can be made without departing from the concept of the invention.

For example, in the above embodiment, the back surface part 13 is arranged on the inner surface 35 so as to run along the inner surface 35 of the rim flange part 32 in the reference state. However, the invention is not limited to this. For example, the flat surface part of the back surface part may be arranged on the inner surface of the rim flange part, and the concave surface part may be arranged closer to the inner side in the tire width direction than the inner surface of the rim flange part. Moreover, for example, the back surface part may be arranged on the inner side of the inner surface in the tire width direction so as to run along the inner surface of the rim flange part, and the back surface part and the inner surfaces of the rim flange part may extend parallel to each other with spacing therebetween in the tire width direction.

Additionally, in the above embodiment, the first inclined surface 18 is disposed at the portion of the base surface part 12 corresponding to the bead core 17 over the entire length of this portion in the tire width direction H. However, the invention is not limited to this. Additionally, the second inclined surface 19 may not be provided in the base surface part 12.

Additionally, in the above embodiment, the back surface part 13 is arranged on the inner surface 35 of the rim flange part 32 or closer to the inner side I in the tire width direction H than the inner surface 35 in the reference state. However, the invention is not limited to this. For example, the back surface part may be brought into pressure contact with the inner surface of the rim flange part in the reference state.

Moreover, in the above embodiment, the connecting portion of the back surface part 13 connected with the heel part 14 is formed with the flat surface part 20. However, the flat surface part 20 may not be provided.

Additionally, in the above embodiment, the bead core 17 is arranged on the inner side I in the tire width direction H with respect to the heel part 14. However, the invention is not limited to this. For example, the position of the bead core in the tire width direction and the position of the heel part in the tire width direction may overlap each other.

Moreover, in the above embodiment, the coupling part 15 between the heel part 14 and the base surface part 12, and the coupling part 16 between the heel part 14 and the back surface part 13, are both formed in a convexly curved line in the sectional view. However, the invention is not limited to this.

Furthermore, in the above embodiment, the bead part 14 is formed in a linear line or a concavely curved line that gradually extends toward the outer side in the tire radial direction R as it is directed from the inner side I to the outer side O in the tire width direction H, in the sectional view. However, the invention is not limited to this.

In addition, the constituent elements in the aforementioned embodiment can be substituted with well-known constituent elements without departing from the concept of the invention, and the aforementioned embodiment may be appropriately combined.

INDUSTRIAL APPLICABILITY

It is possible to provide a pneumatic tire that can prevent a large force from acting thereon from the applied rim and improve rim fitting performance, thereby improving uniformity.

REFERENCE SIGNS LIST

10: PNEUMATIC TIRE
11: BEAD PART
12: BASE SURFACE PART
13: BACK SURFACE PART
14: HEEL PART
15, 16: COUPLING PART
17: BEAD CORE
18: FIRST INCLINED SURFACE
19: SECOND INCLINED SURFACE
20: FLAT SURFACE PART
30: APPLIED RIM
31: RIM BASE PART
32: RIM FLANGE PART
35: INNER SURFACE
H: TIRE WIDTH DIRECTION
I: INNER SIDE
O: OUTER SIDE
R: TIRE RADIAL DIRECTION
L: IMAGINARY REFERENCE LINE
$\theta 1, \theta 2$: INCLINATION ANGLE

What is claimed is:

1. A pneumatic tire mounted on an applied rim,
Wherein surfaces of each of a pair of left and right bead parts each having a bead core buried therein consists of:
a base surface part that faces an inner side in a tire radial direction and is supported from the inner side in the tire radial direction by a rim base part of the applied rim;
a back surface part that faces an outer side in a tire width direction and is supported from the outer side in the tire width direction by a rim flange part of the applied rim; and
a heel part that couples an end portion of the base surface part on the outer side in the tire width direction and an end portion of the back surface part on the inner side in the tire radial direction; and,
a surface that extends from an end portion of the base surface part on an inner side in the tire width direction to an outer side in the tire radial direction,
wherein the back surface part is arranged on an inner surface facing an inner side of the rim flange part in the tire width direction or arranged closer to the inner side in the tire width direction than the inner surface, in a no-load reference state where the pneumatic tire is mounted on the applied rim and the internal pressure of the pneumatic tire is set to atmospheric pressure, wherein a flat surface part extending linearly along the tire radial direction in the reference state is formed in a connecting portion of the back surface part connected with the heel part, wherein the base surface part is formed with:

a first inclined surface that inclines with respect to an imaginary reference line extending along the tire width direction and extends linearly toward the inner side in the tire radial direction as it is directed from the outer side to the inner side in the tire width direction, in a sectional view along both the tire width direction and the tire radial direction; and a second inclined surface that is connected to the first inclined surface from the inner side in the tire width direction and that inclines with respect to the imaginary reference line in the sectional view, an inclination angle of the second inclined surface formed with respect to the imaginary reference line being larger than an inclination angle at which the first inclined surface is formed with the imaginary reference line, wherein the first inclined surface is disposed at a portion of the base surface part corresponding to the bead core over the entire length of the portion in the tire width direction, wherein the second inclined surface is disposed in a portion of the base surface part located closer to the inner side in the tire width direction than the first inclined surface over the entire length of the portion in the tire width direction, wherein the heel part is formed in a linear line or a concavely curved line that gradually extends toward the outer side in the tire radial direction as it is directed from the inner side to the outer side in the tire width direction, in the sectional view along both the tire width direction and the tire radial direction, wherein a coupling part between the heel part and the base surface part, and a coupling part between the heel part and the back surface part are each formed in a convexly curved line in the sectional view, and wherein the bead core is arranged on the inner side in the tire width direction with respect to the heel part.

2. The pneumatic tire according to claim 1, wherein the inclination angle at which the first inclined surface is formed with respect to the imaginary reference line in the sectional view may be 6.5 degrees to 12 degrees, and wherein in the sectional view, the inclination angle at which the second inclined surface may be formed with respect to the imaginary reference line is larger than the inclination angle at which the first inclined surface is formed with respect to the imaginary reference line and the inclination angle of the second inclined surface may be 17 degrees to 23 degrees.

3. The pneumatic tire according to claim 1, wherein the tire radial distance of the bead core from the heel part to the base surface part and the tire width-direction distance of the bead core from the heel part to the back surface part are made such that one thereof is 90% to 100% of the other.

4. The pneumatic tire according to claim 1, wherein in the no-load reference state, the entire bead core is arranged on the inner side in the tire width direction with respect to an end of the heel part which connects to the base surface part.

5. The pneumatic tire according to claim 1, wherein a width of the bead core in the tire width direction is wider than a width of a portion of each of the pair of bead parts, which is located closer to the inner side in the tire width direction than the bead core, in the tire width direction.

6. The pneumatic tire according to claim 1, wherein each of the pair of left and right bead parts is disposed at the outer side in the tire width direction with respect to a hump part of the applied rim.

* * * * *